(12) United States Patent
Chen et al.

(10) Patent No.: US 12,539,734 B2
(45) Date of Patent: Feb. 3, 2026

(54) COMBINATION OF ROOF TOP AIR CONDITIONING UNIT BASE PAN AND AIR INLET DUCT

(71) Applicant: Dometic Sweden AB, Solna (SE)

(72) Inventors: Jianmin Chen, Guangdong (CN); Sihu Liu, Guangdong (CN)

(73) Assignee: Dometic Sweden AB, Solna (SE)

( * ) Notice: Subject to any disclaimer, the term of this patent is extended or adjusted under 35 U.S.C. 154(b) by 957 days.

(21) Appl. No.: 17/423,251

(22) PCT Filed: Jan. 15, 2020

(86) PCT No.: PCT/CN2020/072164
§ 371 (c)(1),
(2) Date: Jul. 15, 2021

(87) PCT Pub. No.: WO2020/151541
PCT Pub. Date: Jul. 30, 2020

(65) Prior Publication Data
US 2022/0063369 A1    Mar. 3, 2022

(30) Foreign Application Priority Data

Jan. 23, 2019 (CN) .......................... 201920116576.2

(51) Int. Cl.
*B60H 1/00* (2006.01)
*B60H 1/26* (2006.01)

(52) U.S. Cl.
CPC ..... *B60H 1/00371* (2013.01); *B60H 1/00564* (2013.01); *B60H 1/262* (2013.01)

(58) Field of Classification Search
CPC ................ B60H 1/00564; B60H 1/262; B60H 1/00371; B60H 1/00535; B60H 1/00207;
(Continued)

(56) References Cited

U.S. PATENT DOCUMENTS 1,983,979 A * 12/1934 Graham ............. B60H 1/00464
454/117
2,638,835 A * 5/1953 Strawsine ............... F24F 7/025
454/345

(Continued)

FOREIGN PATENT DOCUMENTS

| AU | 2004202967 | 3/2011 |
| AU | 2007200788 | 9/2011 |

(Continued)

OTHER PUBLICATIONS

AU Patent Application No. 2020212092 titled "Combination of overhead air-conditioning unit" filed on Jun. 17, 2021.
(Continued)

*Primary Examiner* — Edelmira Bosques
*Assistant Examiner* — Frances F. Hamilton
(74) *Attorney, Agent, or Firm* — Dinsmore & Shohl LLP

(57) ABSTRACT

The present embodiments relate to a roof top air conditioning unit with connection air ducts. The plurality of air connection air ducts are disposed between a roof top unit and an air distribution box. The plurality of connection air ducts define an adjustable height for the air duct that may compensate for vehicles of differing roof thickness dimension.

13 Claims, 2 Drawing Sheets

(58) Field of Classification Search
CPC ....... B60H 2001/00235; B60H 1/00364; F24F 2221/16
USPC .......................................................... 454/138
See application file for complete search history.

(56) References Cited

U.S. PATENT DOCUMENTS

| | | | |
|---|---|---|---|
| 3,680,468 A * | 8/1972 | Schueler | B60H 1/00364 454/324 |
| D226,381 S | 2/1973 | Harty, Jr. | |
| 3,867,486 A * | 2/1975 | Nagele | F24F 6/04 261/106 |
| 4,051,770 A * | 10/1977 | Felter | F24F 7/025 454/345 |
| D284,025 S | 5/1986 | Armstrong | |
| 4,641,502 A | 2/1987 | Aldrich | |
| 4,672,818 A | 6/1987 | Roth | |
| 4,709,623 A * | 12/1987 | Roth | B60H 1/262 454/136 |
| D300,777 S | 4/1989 | Bales | |
| D306,341 S | 2/1990 | Bales | |
| 5,531,641 A * | 7/1996 | Aldrich | B60H 1/247 454/232 |
| 5,848,536 A | 12/1998 | Dodge | |
| 6,183,360 B1 * | 2/2001 | Luter, II | F24F 7/02 454/82 |
| 6,213,197 B1 | 4/2001 | Ebbeson | |
| 6,263,689 B1 | 7/2001 | Dodge | |
| 6,318,410 B1 * | 11/2001 | Miyajima | B29C 49/0411 138/155 |
| 6,339,934 B1 * | 1/2002 | Yoon | B60H 1/00535 62/244 |
| 6,449,973 B2 | 9/2002 | Dodge | |
| 6,536,222 B1 * | 3/2003 | Ahn | B60H 1/00364 62/244 |
| 6,749,255 B2 * | 6/2004 | Dykman | B60H 1/00564 296/214 |
| 6,857,953 B2 | 2/2005 | Malott | |
| 7,140,192 B2 | 11/2006 | Allen | |
| 7,171,822 B2 | 2/2007 | Allen | |
| 7,234,315 B2 | 6/2007 | Allen | |
| 7,237,397 B2 | 7/2007 | Allen | |
| 7,316,119 B2 | 1/2008 | Allen | |
| 7,419,368 B2 | 9/2008 | Milks | |
| 7,431,344 B2 * | 10/2008 | Clark | F02M 35/10144 285/236 |
| D588,479 S | 3/2009 | Giese | |
| 7,739,882 B2 | 6/2010 | Evans | |
| 7,963,117 B2 | 6/2011 | Allen | |
| 8,056,351 B2 | 11/2011 | Marciano | |
| D661,386 S | 6/2012 | Bergin | |
| 8,240,168 B2 | 8/2012 | Holguin | |
| 8,440,143 B2 | 5/2013 | Liptak | |
| 8,535,127 B2 * | 9/2013 | Malott | F24F 13/10 52/302.1 |
| 8,568,209 B2 | 10/2013 | Boxum | |
| D712,531 S | 9/2014 | Bergin | |
| D715,907 S | 10/2014 | Bergin | |
| D716,925 S | 11/2014 | Bergin | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| D811,566 S | 2/2018 | Liu | |
| D817,466 S | 5/2018 | Moseley | |
| 9,975,405 B2 * | 5/2018 | Siddiqui | B60H 1/3407 |
| D824,499 S | 7/2018 | Williamson | |
| 10,082,345 B1 | 9/2018 | Mihail | |
| 10,093,152 B2 | 10/2018 | Allard | |
| D841,138 S | 2/2019 | Williamson | |
| D850,609 S | 6/2019 | Bergin | |
| D862,668 S | 10/2019 | Moseley | |
| D865,926 S | 11/2019 | Moseley | |
| 10,589,593 B2 | 3/2020 | Westendarp | |
| D884,870 S | 5/2020 | Bergin | |
| 10,675,941 B2 | 6/2020 | Williamson | |
| 10,696,129 B2 | 6/2020 | Bergin | |
| D905,217 S | 12/2020 | Hederstierna | |
| D907,183 S | 1/2021 | Meda | |
| 10,941,955 B2 | 3/2021 | Heral | |
| D915,569 S | 4/2021 | Meda | |
| D917,036 S | 4/2021 | Hederstierna | |
| 11,034,208 B2 | 6/2021 | Williamson | |
| D940,289 S | 1/2022 | Hederstierna | |
| 11,788,743 B2 * | 10/2023 | Daniels | F24F 5/0046 29/897.3 |
| 2005/0087332 A1 * | 4/2005 | Umeo | B60H 1/00378 62/244 |
| 2006/0052050 A1 | 3/2006 | Malott | |
| 2007/0227693 A1 | 10/2007 | Allen | |
| 2008/0202138 A1 | 8/2008 | Pabisz | |
| 2009/0209193 A1 | 8/2009 | Kloster | |
| 2009/0217608 A1 * | 9/2009 | Braun | B60H 1/245 52/302.1 |
| 2010/0006257 A1 * | 1/2010 | Schutz | B60H 1/00535 165/61 |
| 2010/0056035 A1 * | 3/2010 | Hua | B60H 1/262 454/139 |
| 2011/0061414 A1 | 3/2011 | Mcallister, II et al. | |
| 2011/0073017 A1 * | 3/2011 | Wilson, Jr. | F16M 5/00 248/346.03 |
| 2013/0205811 A1 | 8/2013 | Esch | |
| 2014/0196495 A1 * | 7/2014 | Marks | F24F 13/32 62/426 |
| 2014/0223928 A1 | 8/2014 | Esch | |
| 2019/0047353 A1 | 2/2019 | Williamson | |
| 2019/0047354 A1 | 2/2019 | Williamson | |
| 2019/0128551 A1 | 5/2019 | Heral | |
| 2019/0315197 A1 | 10/2019 | Williamson | |
| 2019/0316808 A1 * | 10/2019 | Benton | F24F 13/32 |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |
| 2021/0061054 A1 | 3/2021 | Meda | |
| 2021/0061058 A1 | 3/2021 | Meda | |
| 2021/0061060 A1 | 3/2021 | Meda | |
| 2021/0207882 A1 | 7/2021 | Jurek | |
| 2021/0239105 A1 | 8/2021 | Allard | |
| 2021/0276396 A1 | 9/2021 | Jurek | |
| 2021/0354526 A1 | 11/2021 | Williamson | |
| 2022/0001718 A1 | 1/2022 | Jurek | |
| 2022/0009306 A1 | 1/2022 | Hornung | |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |

(56) References Cited

FOREIGN PATENT DOCUMENTS

| | | | |
|---|---|---|---|
| AU | 201816419 | 1/2019 | |
| AU | 201910037 | 2/2019 | |
| AU | 201910038 | 2/2019 | |
| AU | 201911094 | 4/2019 | |
| AU | 201912125 | 6/2019 | |
| AU | 2017364256 | 6/2019 | |
| AU | 2019202512 | 10/2019 | |
| AU | 201915241 | 12/2019 | |
| AU | 201916406 | 12/2019 | |
| AU | 201916408 | 12/2019 | |
| AU | 201916409 | 12/2019 | |
| AU | 2018366469 | 5/2020 | |
| AU | 202016120 | 1/2021 | |
| AU | 202016121 | 1/2021 | |
| AU | 202016122 | 1/2021 | |
| AU | 202016123 | 1/2021 | |
| AU | 2020212092 A1 | 7/2021 | |
| CA | 2518348 | 3/2006 | |
| CA | 2578651 | 8/2007 | |
| CA | 2587994 | 12/2007 | |
| CA | 2611822 | 5/2008 | |
| CA | 2686403 | 5/2010 | |
| CA | 2906348 | 9/2014 | |
| CA | 2951956 | 12/2015 | |
| CA | 2954152 | 1/2016 | |
| CA | 165232 S | 5/2016 | |
| CA | 165233 S | 5/2016 | |
| CA | 167431 S | 2/2017 | |
| CA | 172872 S | 2/2017 | |
| CA | 172873 S | 2/2017 | |
| CA | 172874 S | 2/2017 | |
| CN | 201983536 U | 9/2011 | |
| CN | 202180724 U | 4/2012 | |
| CN | 103090468 A * | 5/2013 | |
| CN | 103237671 A | 8/2013 | |
| CN | 103687735 A | 3/2014 | |
| CN | 203940584 U * | 11/2014 | |
| CN | 104986013 A * | 10/2015 | |
| CN | 204830378 U | 12/2015 | |
| CN | 204923367 U | 12/2015 | |
| CN | 106470856 A | 3/2017 | |
| CN | 304097003 S | 4/2017 | |
| CN | 106976376 A | 7/2017 | |
| CN | 109070688 A | 12/2018 | |
| CN | 305029216 S | 2/2019 | |
| CN | 305029217 S | 2/2019 | |
| CN | 305029218 S | 2/2019 | |
| CN | 305105066 S | 4/2019 | |
| CN | 110293813 A | 10/2019 | |
| CN | 110385958 A | 10/2019 | |
| CN | 305397384 S | 10/2019 | |
| CN | 210118942 U | 2/2020 | |
| CN | 111344168 A | 6/2020 | |
| CN | 213237518 | 5/2021 | |
| CN | 213237945 | 5/2021 | |
| CN | 306672354 S | 7/2021 | |
| CN | 306681352 S | 7/2021 | |
| CN | 306901266 S | 10/2021 | |
| DE | 19654261 | 6/1998 | |
| DE | 69503723 | 9/1998 | |
| DE | 19730136 | 1/1999 | |
| DE | 10215272 A1 | 10/2003 | |
| DE | 69817899 | 10/2003 | |
| DE | 10255833 | 6/2004 | |
| DE | 10336767 | 12/2004 | |
| DE | 59812376 | 1/2005 | |
| DE | 202004007924 | 11/2005 | |
| DE | 202005013530 | 12/2005 | |
| DE | 202004017266 | 4/2006 | |
| DE | 202005000560 | 6/2006 | |
| DE | 102005030362 | 11/2006 | |
| DE | 602004004480 | 3/2007 | |
| DE | 202006001374 | 7/2007 | |
| DE | 202006001376 | 7/2007 | |
| DE | 202006001377 | 7/2007 | |
| DE | 202006009803 | 12/2007 | |
| DE | 202007006292 | 10/2008 | |
| DE | 102007038716 | 2/2009 | |
| DE | 602005012194 | 2/2009 | |
| DE | 202008003123 | 9/2009 | |
| DE | 102008028066 | 12/2009 | |
| DE | 602007009584 | 11/2010 | |
| DE | 502007006725 | 4/2011 | |
| DE | 202011101256 | 12/2011 | |
| DE | 202010012578 | 2/2012 | |
| DE | 202011002986 | 7/2014 | |
| DE | 202013004158 | 9/2014 | |
| DE | 102016220768 | 4/2018 | |
| DE | 112017000915 | 10/2018 | |
| DE | 102017207797 | 11/2018 | |
| DE | 102017214941 | 2/2019 | |
| DE | 102017219353 | 5/2019 | |
| DE | 112017005541 | 8/2019 | |
| DE | 102018204532 | 9/2019 | |
| DE | 102018206490 | 10/2019 | |
| DE | 102019205194 | 10/2019 | |
| DE | 102018206854 | 11/2019 | |
| DE | 112018003284 | 3/2020 | |
| DE | 202015009786 | 3/2020 | |
| DE | 212018000248 | 3/2020 | |
| DE | 212018000249 | 3/2020 | |
| DE | 112018003288 | 4/2020 | |
| DE | 102018222877 | 6/2020 | |
| DE | 102018222877 A1 | 6/2020 | |
| DE | 112018005002 | 7/2020 | |
| DE | 112018005883 | 7/2020 | |
| DE | 102020203424 | 7/2021 | |
| DE | 112020000265 | 9/2021 | |
| DE | 102020206181 | 11/2021 | |
| DE | 102020206182 | 11/2021 | |
| DE | 102020206183 | 11/2021 | |
| DE | 112020001585 T5 * | 12/2021 | |
| EP | 700801 | 3/1996 | |
| EP | 869018 | 10/1998 | |
| EP | 892225 | 1/1999 | |
| EP | 0846582 B1 * | 2/2004 | ............ B60H 1/262 |
| EP | 1538009 | 6/2005 | |
| EP | 1634740 | 3/2006 | |
| EP | 1721765 | 11/2006 | |
| EP | 1752717 | 2/2007 | |
| EP | 1826041 | 8/2007 | |
| EP | 1870270 | 12/2007 | |
| EP | 1925889 | 5/2008 | |
| EP | 1955946 | 8/2008 | |
| EP | 1988612 | 11/2008 | |
| EP | 2189312 | 5/2010 | |
| EP | 2192040 | 6/2010 | |
| EP | 2196390 | 6/2010 | |
| EP | 2433658 | 3/2012 | |
| EP | 2665611 | 10/2014 | |
| EP | 2178710 | 11/2015 | |
| EP | 2616258 | 2/2016 | |
| EP | 3113965 | 1/2017 | |
| EP | 3241695 | 4/2018 | |
| EP | 2714440 | 5/2018 | |
| EP | 2994326 | 7/2018 | |
| EP | 3401619 | 11/2018 | |
| EP | 3411250 | 12/2018 | |
| EP | 3476630 | 5/2019 | |
| EP | 3543047 | 9/2019 | |
| EP | 3564564 | 11/2019 | |
| EP | 3592585 | 7/2021 | |
| JP | 107332758 A | 12/1995 | |
| JP | 2008-8501 A | 1/2008 | |
| KR | 200443574 Y1 * | 2/2009 | ............. F24F 13/02 |
| KR | 20090075959 A * | 7/2009 | ............... F16L 5/00 |
| RU | 2753994 C2 | 8/2021 | |
| WO | 2009021994 A1 | 2/2009 | |
| WO | 2012034695 A1 | 3/2012 | |
| WO | 2012113538 A1 | 8/2012 | |
| WO | 2012159749 A1 | 11/2012 | |
| WO | 2014143181 A1 | 9/2014 | |
| WO | 2014180559 A1 | 11/2014 | |
| WO | WO-2016004522 A1 * | 1/2016 | .......... B29C 67/205 |

(56) References Cited

FOREIGN PATENT DOCUMENTS

| WO | 2017143393 | A1 | 8/2017 |
|---|---|---|---|
| WO | 2017143394 | A1 | 8/2017 |
| WO | 2018096127 | A1 | 5/2018 |
| WO | 2019038023 | A1 | 2/2019 |
| WO | 2019082168 | A1 | 5/2019 |
| WO | 2019097448 | A1 | 5/2019 |
| WO | 2019207451 | A2 | 10/2019 |
| WO | 2019229706 | A1 | 12/2019 |
| WO | 2019244011 | A1 | 12/2019 |
| WO | 2020143636 | A1 | 7/2020 |
| WO | 2020151541 | A1 | 7/2020 |
| WO | 2020188485 | A2 | 9/2020 |
| WO | 2020192746 | A1 | 10/2020 |
| WO | 2021074841 | | 4/2021 |
| WO | 20210186414 | | 9/2021 |
| WO | 2021228601 | A1 | 11/2021 |
| WO | 2021228605 | A1 | 11/2021 |
| WO | 2021228620 | A1 | 11/2021 |

OTHER PUBLICATIONS

DE Patent Application No. 112020000265.9 titled "Flexible duct connecting way between roof top air conditioner and ADB" filed on Jul. 14, 2021.
PCT Application No. PCT/CN2020/072164 titled "Flexible duct connecting way between roof top air conditioner and ADB" filed on Jan. 15, 2020.
International Search Report and Written Opinion for PCT/CN2020/072164 mailed Mar. 24, 2020, 12 pages.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine OFF; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Apr. 1, 2016.
Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/GB/marketsproducts/truck/air-conditioning/products/cool-top-vario/ Apr. 25, 2016.
Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Design U.S. Appl. No. 29/760,605, filed Dec. 2, 2020.
U.S. Appl. No. 63/141,800, filed Jan. 26, 2021 titled Air Conditioning System for a Vehicle.
Design U.S. Appl. No. 29/767,929, filed Jan. 26, 2021 titled Air Conditioner Housing.
Design U.S. Appl. No. 29/774,535, filed Mar. 17, 2021 titled Air Distribution Box.
U.S. Appl. No. 63/175,304, filed Apr. 1, 2021.
U.S. Appl. No. 62/819,711, filed Mar. 18, 2019 titled Mobile Air Conditioner.
U.S. Appl. No. 17/579,442, filed Jan. 19, 2022 titled "Heating Arrangement and Heat Distribution Unit for Such a Heating Arrangement".
U.S. Appl. No. 17/673,080, filed Feb. 16, 2022 titled "Recreational Vehicle, Cooling Device, Controlling System and Method for Controlling the Cooling Device".
Design U.S. Appl. No. 29/826,755, filed Feb. 15, 2022 titled "Housing".
Design U.S. Appl. No. 29/826,757, filed Feb. 15, 2022 titled "Housing".
U.S. Appl. No. 17/440,104, filed Sep. 16, 2021 titled "Mobile Air Conditioner".
Design U.S. Appl. No. 29/715,592, filed Dec. 3, 2019 titled Filter Housing.
Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
International Preliminary Report on Patentability received for PCT/CN2020/072164 mailed on Jul. 27, 2021.
Office Action received for DE Patent Application No. 112020000265.9 mailed on Sep. 6, 2022.
Office Action received for DE Patent Application No. 112020000265.9 on May 14, 2024.
Examination Report issued in AU Patent Application No. 2020212092 mailed on Dec. 20, 2024.

\* cited by examiner

COMBINATION OF ROOF TOP AIR CONDITIONING UNIT BASE PAN AND AIR INLET DUCT

TECHNICAL FIELD

The present embodiments relate to the technical field of air conditioning, and in particular to a combination of a roof top air conditioning unit.

BACKGROUND ART

When a roof top air conditioning unit is used, a combination of a roof top unit, a roof, an air distribution box and a plurality of connection air ducts is usually required. Specifically, the roof top unit is in communication with the air distribution box through the plurality of connection air ducts via the roof, such that cold air can enter an air inlet of the air distribution box from a base pan air outlet through the connection air ducts and thus be is blown into a room. However, in different service environments, the thickness of the roof varies, for example, generally between 20 mm and 100 mm, and the connection air ducts that communicate the roof top unit and the air distribution box via the roof usually have a fixed thicknesses. Therefore, when in a service environment that the thickness of the roof is not an integer multiple of the thickness of the connection air ducts, the following situations usually occur: if one less connection air duct is connected, the thickness of the multiple connection air ducts will be less than the thickness of the roof, that is, there is a roof thickness gap; and if one more connection air duct is connected, the connection air duct will extend a certain distance (in this case the roof thickness gap or the extension distance will be less than the thickness of one connection air duct). In order to solve the above problem, a soft foam sponge is used in the prior art to adjust the existing gap. The thickness that the foam sponge commonly uses is the thickness of the connection air ducts minus 1 mm, such that the foam sponge can be compressed in a numerical range from 1 mm to the thickness of the connection air ducts minus 1 mm so as to achieve the gap adjustment effect. However, this will increase the complexity of assembly, thus increasing the cost. In addition, even if the foam sponge is soft, it is rather difficult when the foam sponge needs to be compressed to a very thin thickness, such as 1 mm.

SUMMARY

The present embodiments are intended to at least solve the technical problem mentioned above in the related art to a certain extent. To this end, according to the present embodiments, a combination of a roof top air conditioning unit is proposed.

In order to achieve the above purpose, a combination of a roof top air conditioning unit is proposed, the combination comprising a roof top unit, a roof, connection air ducts and an air distribution box, wherein the roof top unit is disposed on an outer wall surface of the roof, the roof top unit having a base pan provided with an air outlet; the air distribution box disposed on an inner wall surface of the roof, the air distribution box provided with an air inlet upper duct; the plurality of connection air ducts communicating the air outlet of the base pan with the air inlet upper duct of the air distribution box via the opening of the roof, characterized in that an adjustment portion for adjusting a roof thickness gap is provided around the air outlet of the base pan.

In the combination of a roof top air conditioning unit according to the present embodiments, the above roof thickness gap is adjusted by means of the adjustment portion provided around the air outlet of the base pan, such that the roof thickness gap is no longer adjusted by means of compression of the foam sponge, which simplifies the complexity of assembly such that the mounting process is simpler, and thus the cost is reduced.

In addition, the combination of a roof top air conditioning unit according to the present embodiments may further have the following additional technical features.

According to one aspect, the adjustment structure is a groove for connecting with the connection air ducts, with a depth of the groove being greater than or equal to a thickness of at least one of the connection air duct.

According to one aspect, the depth of the groove may be 8-20 mm.

According to one aspect, the depth of the groove may be 14 mm.

According to one aspect, a substantially airtight gap is provided between the connection air duct and the groove in a direction substantially perpendicular to the base pan of the roof top unit.

According to one aspect, the connection between the connection air duct and the groove is substantially sealed.

According to one aspect, the connection air duct may be an EPP connection air duct.

According to one aspect, the thickness of one of the connection air ducts may be 8-15 mm.

According to one aspect, the thickness of one of the connection air ducts may be 10 mm.

According to one aspect, the connection air duct connected to the air inlet upper duct of the air distribution box has a structure, at the lower portion thereof, fitting the shape of the upper portion of the air inlet upper duct.

According to one aspect of the embodiments, the roof may be a vehicle roof.

BRIEF DESCRIPTION OF THE DRAWINGS

The present embodiments will be further explained below in conjunction with the accompanying drawings and the embodiments. In the accompanying drawings.

DETAILED DESCRIPTION OF EMBODIMENTS

Figure 1:
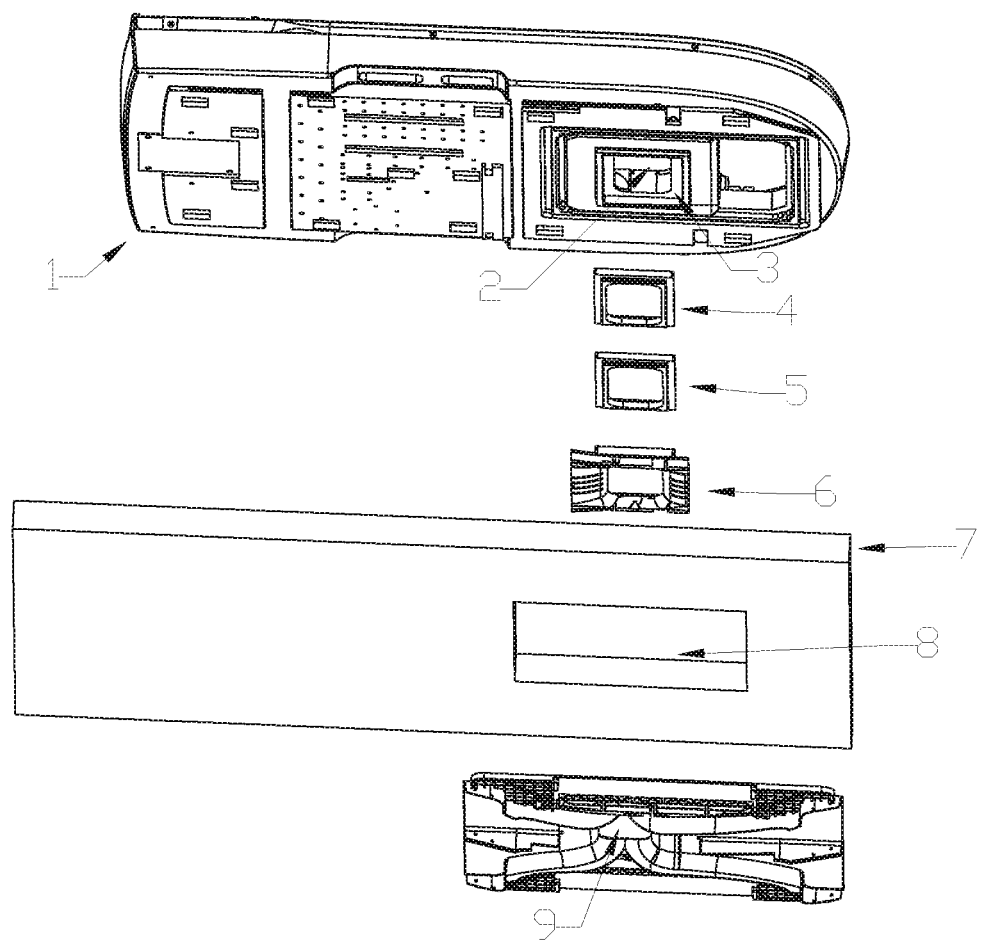
FIG. 1 is an exploded view of the partial structure of a combination of a roof top air conditioning unit according to some embodiments.

The embodiments will be described in detail below, and examples are shown in the accompanying drawings, in which the same or similar reference numerals refer to the same or similar elements or the elements having the same or similar functions. The embodiments described below with reference to the accompanying drawings are exemplary and are intended to be illustrative, but should not be construed as limiting the present embodiments.

A combination of a roof top air conditioning unit according to the present embodiments will be described below with reference to the accompanying drawings.

Figure 3:
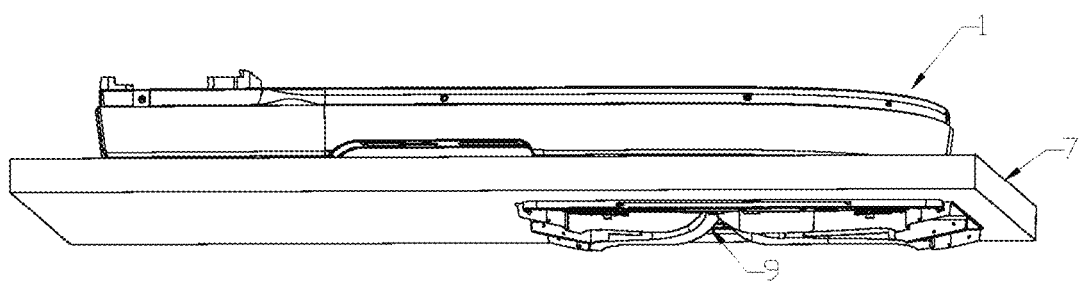
FIG. 3 is a perspective view of the partial structure of the combination of a roof top air conditioning unit.

FIG. 1 shows an exploded view of the partial structure of an exemplary embodiment of the combination of a roof top air conditioning unit. The partial structure of the combination of a roof top air conditioning unit comprises a base pan 1 of a roof top unit, a base pan air outlet 2, a groove 3 surrounding the base pan air outlet 2, a first connection air duct 4, a second connection air duct 5, a third connection air duct 6, a roof 7 having an opening 8, and an air inlet upper duct 9 of an air distribution box, wherein the third connection air duct 6 is additionally provided with a structure, at the lower portion thereof, fitting the shape of the upper portion of the air inlet upper duct 9. The base pan 1 is disposed on the outer wall of the roof 7, wherein the base pan air outlet 2 is aligned with the opening 8 of the roof, and the air inlet upper duct 9 is provided on an inner wall of the roof 7, wherein the upper portion of the air inlet upper duct 9 is aligned with the opening 8 of the roof; the lower portion of the third connection air duct 6 is adapted and connected to the upper portion of the air inlet upper duct 9; and the upper portion of the third connection air duct 6 is stacked with the second connection air duct 5, the second connection air duct 5 is stacked with the first connection air duct 4, and the first connection air duct 4 is at least partially accommodated in the groove 3, so as to form the perspective view of the partial structure of the combination of a roof top air conditioning unit according to the present embodiment shown in FIG. 3.

Figure 2:
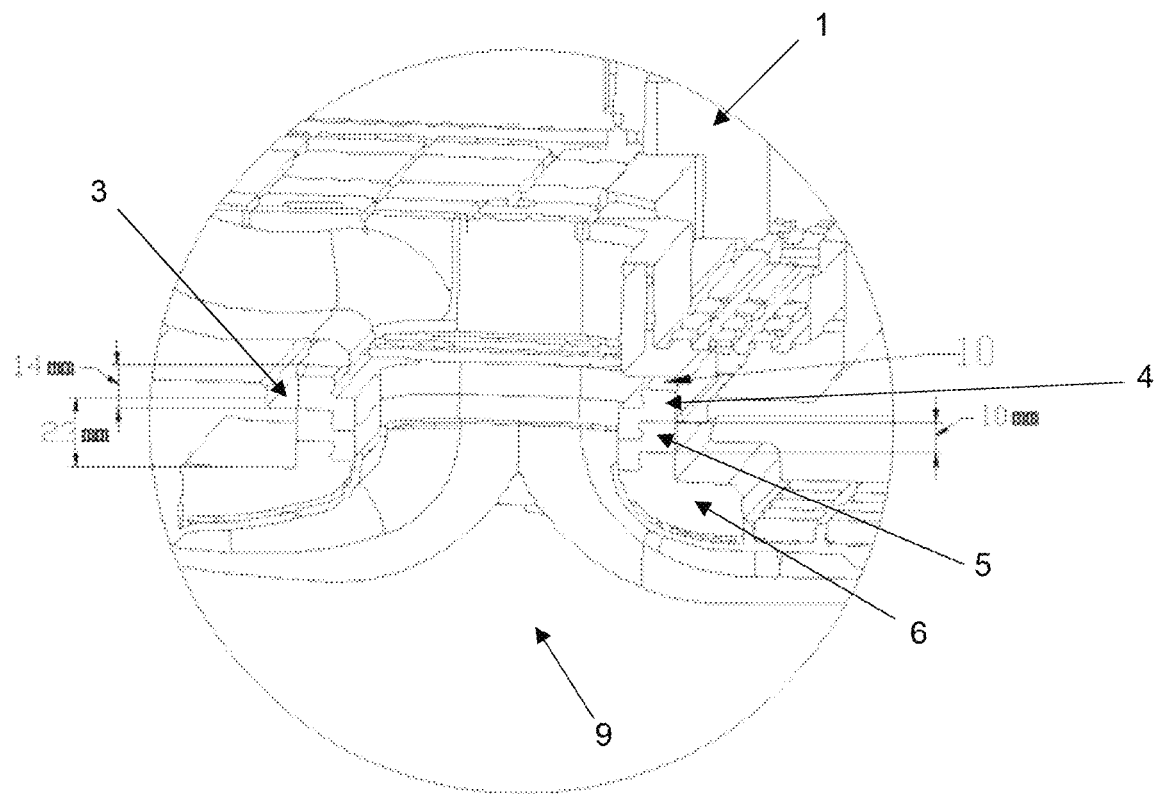
FIG. 2 is a cross-sectional view of the partial mounting structure of the combination of a roof top air conditioning unit.

FIG. 2 shows the cross-sectional view of the partial structure, i.e., a connecting structure, of an exemplary embodiment of the combination of a roof top air conditioning unit according to the present embodiment. In this exemplary embodiment, the combination is in a service environment in which the thickness of the roof 7 (FIG. 1) is 23 mm, wherein the depth of the groove 3 may be 14 mm, and the thickness of the connection air ducts (the EPP connection air ducts) 4, 5 and 6 may be 10 mm. As shown in FIG. 2, after the third connection air duct 6 is connected to the second connection air duct 5, there will be a roof thickness gap of 3 mm which is less than the thickness of a single connection air duct (10 mm). However, since a groove with a depth of 14 mm is provided around the base pan air outlet, the gap of 3 mm can be adjusted, that is, one connection air duct (i.e., the first connection air duct 4) can be further accommodated (i.e., connected) through the groove 3, so as to achieve the connection of the combination of a roof top air conditioning unit, by means of the three connection air ducts, in the case of use of a roof with a thickness between the thickness of the two connection air ducts and the thickness of the three connection air ducts. Furthermore, as shown in FIG. 2, although a gap 10 is provided between the first connection air duct 4 and the groove 3 in a direction substantially perpendicular to the base pan of a roof top unit due to the presence of the groove 3, the first connection air duct can still form a substantially airtight connection with the groove, since the first connection air duct 4 is at least partially accommodated in the groove 3.

It can be seen that the groove 3, according to the present embodiments, can at least partially accommodate the first connection air duct to adjust the gap that is formed when the roof thickness is not an integral multiple of the thickness of the connection air duct, that is, when the roof thickness is a thickness value between the thickness of n connection air ducts and the thickness of n+1 connection air ducts, it is possible to achieve the connection of the combination of a roof top air conditioning unit, by means of connecting n+1 connection air ducts, through the adjustment of the depth of the groove 3 (which is greater than or equal to the thickness of one connection air duct) on the thickness, without compressing foam sponge to adjust the thickness gap generated when using n connection air ducts, thereby simplifying the complexity of assembly such that the mounting process is simpler and thus the cost is reduced.

The embodiments shown in the above accompanying drawings and described above are only exemplary. For the service environments with different roof thicknesses, different numbers of connection air ducts should be used, for example, when the thickness is larger, more connection air ducts can be used. Moreover, it should be understood that, in the case where the depth of the groove is greater than or equal to the thickness of the connection air duct, the depth of the groove and the thickness of the connection air duct can use any value in the respective ranges mentioned above, or alternatively, can use the dimension values outside the above ranges.

In addition, in the combination according to the present embodiments, the roof may be the roof of a vehicle including, but not limited to, a recreation vehicle, a truck or a bus. Additionally or alternatively, the roof may also be the roof of a cruise ship, a ship or a train.

In the description of the present embodiments, it should be noted that the orientations or position relationship indicated by the terms such as "upper", "lower", "inner" and "outer" are based on the orientations or position relationship shown in the accompanying drawings, which is only for ease of description of the present utility model and for simplifying the description, rather than indicating or implying that devices or elements referred to necessarily have a specific orientation structure or operation, and therefore cannot be construed as limiting the present utility model.

Furthermore, the terms "first", "second" and "third" are merely used for the illustrative purpose, and should not be construed as indicating or implying the relative importance, Therefore, the features defined with "first", "second" and "third" can explicitly or implicitly comprise one or more of the features.

Although the embodiments have been shown and described above, it should be understood that the embodiments described above are merely exemplary and should not be construed as limiting, and those of ordinary skill in the art would have made changes, modifications, replacements and variations to the embodiments described above within the scope of the present disclosure.

The invention claimed is:

1. A combination of a roof top air conditioning unit base pan and connection air ducts, the combination comprising:
a roof top unit, a roof, said connection air ducts being a plurality of individual connection air ducts which are in stacked arrangement, and an air distribution box;
wherein the base pan is disposed on an outer wall surface of the roof, the base pan provided with an air outlet;
the air distribution box disposed on an inner wall surface of the roof, the air distribution box provided with an air inlet duct;
the connection air ducts communicating the air outlet of the base pan with the air inlet duct of the air distribution box via an opening through the inner wall surface of the roof;
said plurality of individual connection air ducts comprising a first connection air duct connected to said base pan, a second connection air duct connected to said first connection air duct and to said air distribution box air inlet duct, each of said connection air ducts having an upper surface and a lower surface wherein said lower surface of said first connection air duct is disposed above said upper surface of said second connection air duct; and wherein an adjustment portion is formed in the air outlet of the base pan and has a vertical dimension that is greater than any one of the plurality of individual connection air ducts;

such that the first connection air duct is receivable within the base pan adjustment portion, and is adjustable for differing dimensions between the outer wall surface and the inner wall surface.

2. The combination of claim 1, wherein the adjustment portion is a groove surrounding the base pan outlet, where at least one connection air duct of the plurality of individual connection air ducts is positioned within the base pan outlet groove, and wherein a depth of the groove is greater than or equal to a thickness of the at least one of the connection air ducts.

3. The combination of claim 2, wherein the depth of the groove is 8-20 mm.

4. The combination of claim 3, wherein the depth of the groove is 14 mm.

5. The combination of claim 2, wherein a substantially airtight gap is provided between the connection air ducts and the groove in a direction substantially perpendicular to the base pan of the roof top unit.

6. The combination of claim 1, wherein a connection between the connection air ducts and a groove is substantially sealed.

7. The combination of claim 1, wherein the connection air ducts are EPP connection air ducts.

8. The combination of claim 2, wherein the thickness of one of the connection air ducts is 8-15 mm.

9. The combination of claim 8, wherein the thickness of one of the connection air ducts is 10 mm.

10. The combination of claim 1, wherein the lower surface of the connection air ducts is connectable to an upper surface of the air inlet duct of the air distribution box, the lower surface fitting a shape of an adjacent said upper surface.

11. The combination of claim 1, wherein the roof is a vehicle roof.

12. The combination of claim 1, said plurality of individual connection air ducts comprising a third connection air duct disposed between the first connection air duct and the second connection air duct.

13. A combination of a roof top air conditioning unit base pan and connection air ducts, the combination comprising:

a roof top unit, a roof, said connection air ducts and an air distribution box;

wherein the roof top unit is disposed on an outer wall surface of the roof, the roof top unit having a base pan provided with an air outlet;

the air distribution box is disposed on an inner wall surface of the roof, the air distribution box is provided with an air inlet upper duct;

the connection air ducts are formed of a plurality of individual connection air ducts in stacked arrangement communicating the air outlet of the base pan with the air inlet upper duct of the air distribution box via an opening of the roof;

characterized in that the air outlet of the base pan provides an adjustment portion for adjusting a roof thickness gap;

wherein the adjustment portion has a vertical recess dimension that is greater than any one individual connection air duct of the plurality of individual connection air ducts;

wherein the connection air ducts each having an upper surface and a lower surface, the lowermost connection air duct lower surface are shaped to fit with an upper surface of the air distribution box upper duct;

the connection air ducts upper surface are shaped to fit within the base pan adjustment portion;

such that the any one individual connection air duct is receivable within the base pan adjustment portion, and is adjustable for differing dimensions between the outer wall surface and inner wall surface.

* * * * *